United States Patent
Ferran et al.

(10) Patent No.: US 10,882,413 B2
(45) Date of Patent: Jan. 5, 2021

(54) CHARGING SYSTEM FOR AT LEAST ONE ACCUMULATOR BATTERY OF A VEHICLE INCLUDING HEAT TRANSFER FLUID DISTRIBUTION FOR THERMAL CONDITIONING OF THE BATTERY AND METHOD FOR MANAGING THE RECHARGING OF SAID AT LEAST ONE BATTERY

(71) Applicant: Airbus SAS, Blagnac (FR)

(72) Inventors: Benoit Ferran, Paris (FR); Emmanuel Joubert, Issy-les-Moulineaux (FR); Clément Dinel, Issy-les-Moulineaux (FR)

(73) Assignee: AIRBUS SAS, Blagnac (FR)

( * ) Notice: Subject to any disclaimer, the term of this patent is extended or adjusted under 35 U.S.C. 154(b) by 205 days.

(21) Appl. No.: 16/007,760

(22) Filed: Jun. 13, 2018

(65) Prior Publication Data
US 2018/0361866 A1 Dec. 20, 2018

(30) Foreign Application Priority Data
Jun. 15, 2017 (FR) ...................................... 17 55412

(51) Int. Cl.
*H01M 10/65* (2014.01)
*B60L 53/62* (2019.01)
(Continued)

(52) U.S. Cl.
CPC ............. *B60L 53/62* (2019.02); *B60L 3/0046* (2013.01); *B60L 11/1838* (2013.01);
(Continued)

(58) Field of Classification Search
CPC .... B60L 11/1838; B60L 3/0046; B60L 53/60; B60L 58/24; B60L 58/12; B60L 58/27;
(Continued)

(56) References Cited

U.S. PATENT DOCUMENTS 4,415,847 A * 11/1983 Galloway ........... H01M 10/365
320/150
4,680,241 A * 7/1987 Dyer ..................... H01M 10/44
429/49
(Continued)

FOREIGN PATENT DOCUMENTS

DE 112012003115 8/2014
DE 102013021765 6/2015
(Continued)

OTHER PUBLICATIONS

French Search Report, dated Nov. 23, 2017, priority document.

*Primary Examiner* — Robert Grant
*Assistant Examiner* — John T Trischler
(74) *Attorney, Agent, or Firm* — Greer, Burns & Crain, Ltd.

(57) ABSTRACT

A charging system for electrical accumulator vehicle batteries, comprising a charging station principally designed to generate a charging current for the batteries, a system for thermally conditioning the batteries, by the circulation of a heat transfer fluid. A vehicle-mounted segment comprises a component for measuring the battery temperatures, a system for measuring the state of charge of the batteries, and a heat transfer fluid distribution circuit. A non-vehicle-mounted segment comprises a ground module of the thermal conditioning system for generating a flux of a heat transfer fluid, a control-command module designed to determine, during charging, as a function of the states of charge of the batteries and the battery temperatures, the flow rates and temperatures of the heat transfer fluid and a charging current required to achieve a target final state, characterized by a target temperature and a target charge at the end of a given charging time.

8 Claims, 2 Drawing Sheets

(51) Int. Cl.
  *H01M 10/63* (2014.01)
  *H01M 10/48* (2006.01)
  *H01M 10/44* (2006.01)
  *H01M 10/656* (2014.01)
  *B60L 11/18* (2006.01)
  *H01M 10/613* (2014.01)
  *H01M 10/625* (2014.01)
  *H01M 10/6563* (2014.01)
  *B64D 41/00* (2006.01)
  *B64D 27/24* (2006.01)
  *B60L 3/00* (2019.01)
  *B60L 58/24* (2019.01)
  *B60L 58/12* (2019.01)
  *B60L 58/27* (2019.01)
  *H01M 10/46* (2006.01)

(52) U.S. Cl.
  CPC .............. *B60L 58/12* (2019.02); *B60L 58/24* (2019.02); *B60L 58/27* (2019.02); *B64D 27/24* (2013.01); *B64D 41/00* (2013.01); *H01M 10/44* (2013.01); *H01M 10/443* (2013.01); *H01M 10/46* (2013.01); *H01M 10/486* (2013.01); *H01M 10/613* (2015.04); *H01M 10/625* (2015.04); *H01M 10/63* (2015.04); *H01M 10/656* (2015.04); *H01M 10/6563* (2015.04); *B60L 2200/10* (2013.01); *B60L 2240/36* (2013.01); *B60L 2240/545* (2013.01); *H01M 2220/20* (2013.01)

(58) Field of Classification Search
  CPC ........... H01M 10/6563; H01M 10/486; H01M 10/443; H01M 10/656; H01M 10/613; H01M 10/625; H01M 10/44; H01M 10/46; H01M 10/63; B64D 41/00; B64D 27/24
  USPC ........................................................ 320/109
  See application file for complete search history.

(56) References Cited

U.S. PATENT DOCUMENTS

| | | | | |
|---|---|---|---|---|
| 5,395,708 A * | 3/1995 | Hall | ...................... | B60L 3/0046 429/120 |
| 5,408,209 A * | 4/1995 | Tanzer | ................ | F28D 15/0233 336/60 |
| 5,412,304 A * | 5/1995 | Abbott | .................... | H01F 38/14 320/108 |
| 5,563,491 A * | 10/1996 | Tseng | ....................... | B60L 53/68 320/109 |
| 5,594,315 A * | 1/1997 | Ramos | ................... | H01F 38/14 320/108 |
| 5,909,099 A * | 6/1999 | Watanabe | ............ | A61K 31/726 320/108 |
| 6,051,335 A * | 4/2000 | Dinh-Sybeldon | ..... | H01M 2/145 429/142 |
| 6,138,466 A * | 10/2000 | Lake | .................. | B60H 1/00278 62/199 |
| 6,225,780 B1 * | 5/2001 | Koch | .................... | H02J 7/0013 320/118 |
| 6,394,210 B2 * | 5/2002 | Matsuda | ........... | B60H 1/00278 180/68.1 |
| 6,481,230 B2 * | 11/2002 | Kimishima | ............ | B60H 1/323 62/239 |
| 6,722,460 B2 * | 4/2004 | Yang | ....................... | B62M 7/12 180/220 |
| 7,013,659 B2 * | 3/2006 | Yoshida | ............. | B60H 1/00278 62/186 |
| 7,096,683 B2 * | 8/2006 | Smith | ................ | B60H 1/00207 62/200 |
| 7,143,724 B2 * | 12/2006 | Hashizumi | .......... | H01M 10/486 123/41.56 |
| 7,631,512 B2 * | 12/2009 | Smith | ................ | B60H 1/00207 62/228.3 |
| 7,658,083 B2 * | 2/2010 | Zhu | ...................... | B60H 1/00278 62/243 |
| 7,683,570 B2 * | 3/2010 | Krauer | ...................... | B60L 1/04 320/104 |
| 7,755,329 B2 * | 7/2010 | Kohn | ...................... | H02J 7/0091 320/150 |
| 7,772,799 B2 * | 8/2010 | Wu | ...................... | H02J 7/00036 320/104 |
| 7,890,218 B2 * | 2/2011 | Adams | ............... | B60H 1/00278 700/300 |
| 7,911,184 B2 * | 3/2011 | Kohn | ...................... | H02J 7/0091 180/65.29 |
| 7,928,699 B2 * | 4/2011 | Kohn | .................... | H02J 7/0091 180/65.29 |
| 7,940,028 B1 * | 5/2011 | Hermann | ............. | H01M 16/006 320/151 |
| 7,977,002 B2 * | 7/2011 | Kizaki | ............. | H01M 8/04253 429/428 |
| 8,006,626 B2 * | 8/2011 | Kumar | ............... | H01M 10/625 105/49 |
| 8,037,954 B2 * | 10/2011 | Taguchi | ............. | B60H 1/00257 180/65.1 |
| 8,049,460 B2 * | 11/2011 | Krauer | .................... | B60L 53/14 320/104 |
| 8,173,294 B2 * | 5/2012 | Culver | .................... | H01M 2/24 429/149 |
| 8,174,235 B2 * | 5/2012 | Dyer | ..................... | B60L 53/302 320/109 |
| 8,247,097 B1 * | 8/2012 | Duff | ...................... | H01M 2/1077 429/50 |
| 8,336,319 B2 * | 12/2012 | Johnston | ............... | B60L 3/0046 62/79 |
| 8,344,697 B2 * | 1/2013 | Lienkamp | ............ | B60L 3/0046 320/150 |
| 8,349,485 B2 * | 1/2013 | Culver | .................... | H01M 2/24 429/149 |
| 8,350,526 B2 * | 1/2013 | Dyer | ......................... | B60L 1/003 320/109 |
| 8,402,776 B2 * | 3/2013 | Johnston | ............... | B60L 3/0046 62/79 |
| 8,448,696 B2 * | 5/2013 | Johnston | ............... | B60L 3/0046 165/104.32 |
| 8,450,966 B2 * | 5/2013 | Krauer | .................... | B60L 50/64 320/104 |
| 8,587,253 B2 * | 11/2013 | Dyer | ...................... | B60L 53/14 320/109 |
| 8,679,659 B2 * | 3/2014 | Claypole | .......... | H01M 10/6569 429/50 |
| 8,703,311 B2 * | 4/2014 | Sawaguchi | ............. | B60L 58/27 429/62 |
| 8,725,330 B2 * | 5/2014 | Failing | ...................... | B60L 3/00 701/22 |
| 8,822,064 B2 * | 9/2014 | Culver | ................ | H01M 2/0267 429/161 |
| 8,841,881 B2 * | 9/2014 | Failing | ...................... | B60L 3/00 320/109 |
| 8,910,705 B2 * | 12/2014 | Miura | ...................... | B60H 1/02 165/122 |
| 8,914,260 B2 * | 12/2014 | Epstein | .................... | B60L 53/68 703/1 |
| 9,016,080 B2 * | 4/2015 | Brodie | ................. | H01M 10/625 62/239 |
| 9,038,939 B2 * | 5/2015 | Dyrla | ....................... | B60K 6/00 244/17.11 |
| 9,040,184 B2 * | 5/2015 | Duff | .................... | H01M 2/1077 429/120 |
| 9,067,477 B2 * | 6/2015 | Onimaru | ................ | B60L 3/003 |
| 9,114,719 B1 * | 8/2015 | Failing | .................... | B60L 3/00 |
| 9,114,794 B2 * | 8/2015 | King | ................ | B60H 1/00278 |
| 9,233,618 B2 * | 1/2016 | Dyer | ..................... | B60L 1/003 |
| 9,283,826 B2 * | 3/2016 | Heckenberger | .... | B60H 1/00278 |
| 9,321,362 B2 * | 4/2016 | Woo | ...................... | B60L 53/11 |

(56) References Cited

U.S. PATENT DOCUMENTS

| | | | | |
|---|---|---|---|---|
| 9,340,120 B2* | 5/2016 | Chang | | B60L 58/21 |
| 9,393,878 B1* | 7/2016 | Failing | | B60L 3/00 |
| 9,415,700 B2* | 8/2016 | Skelton | | B60L 50/64 |
| 9,422,922 B2* | 8/2016 | Sant'Anselmo | | F24S 25/10 |
| 9,527,403 B2* | 12/2016 | Mardall | | H01M 10/625 |
| 9,533,551 B2* | 1/2017 | Cheng | | B60H 1/00392 |
| 9,586,497 B2* | 3/2017 | Epstein | | B60L 11/187 |
| 9,676,283 B2* | 6/2017 | Jackson | | B60L 58/26 |
| 9,701,210 B2* | 7/2017 | Woo | | B60L 53/302 |
| 9,707,857 B2* | 7/2017 | Chang | | H02J 7/00 |
| 9,786,961 B2* | 10/2017 | Dyer | | H01M 10/486 |
| 9,802,460 B2* | 10/2017 | Cheng | | H01M 10/6571 |
| 9,802,502 B2* | 10/2017 | Epstein | | B60L 53/53 |
| 9,809,082 B2* | 11/2017 | Cheng | | H01M 10/615 |
| 9,822,752 B2* | 11/2017 | Ragazzi | | F02N 19/04 |
| 9,827,846 B2* | 11/2017 | Porras | | B60K 11/04 |
| 9,853,335 B2* | 12/2017 | Blackwelder | | F25D 17/02 |
| 9,895,959 B2* | 2/2018 | Seto | | B60L 1/003 |
| 9,905,861 B2* | 2/2018 | Dyer | | H01M 6/38 |
| 9,954,260 B2* | 4/2018 | Ho | | H01M 10/63 |
| 10,017,072 B2* | 7/2018 | Galamb | | B60L 53/30 |
| 10,059,165 B2* | 8/2018 | Ho | | H01M 10/486 |
| 10,103,397 B2* | 10/2018 | Kwon | | H01M 8/04828 |
| 10,110,056 B2* | 10/2018 | Dyer | | H02J 7/34 |
| 10,124,691 B1* | 11/2018 | Failing | | B60L 3/00 |
| 10,138,899 B2* | 11/2018 | Joubert | | B64D 27/24 |
| 10,150,570 B2* | 12/2018 | Joubert | | H01M 10/625 |
| 10,211,493 B2* | 2/2019 | Janarthanam | | B60L 1/003 |
| 10,236,543 B2* | 3/2019 | Dyer | | H01M 10/486 |
| 10,259,333 B2* | 4/2019 | Lindholm | | H02J 7/027 |
| 10,286,807 B2* | 5/2019 | Christen | | B60L 58/12 |
| 10,290,911 B2* | 5/2019 | Zhou | | H01M 10/6569 |
| 10,293,706 B2* | 5/2019 | Porras | | B60L 58/24 |
| 10,300,808 B2* | 5/2019 | Newman | | H01M 10/446 |
| 10,337,390 B2* | 7/2019 | Lee | | H02J 7/0029 |
| 10,340,709 B2* | 7/2019 | Dyer | | B60L 53/14 |
| 10,343,484 B2* | 7/2019 | Cheng | | B60L 58/26 |
| 10,369,898 B2* | 8/2019 | Newman | | H02J 7/35 |
| 10,377,251 B2* | 8/2019 | McGrath | | B60L 53/14 |
| 10,377,264 B2* | 8/2019 | Lopez | | B60L 53/16 |
| 10,403,946 B2* | 9/2019 | Jalilevand | | H01M 10/625 |
| 10,449,871 B1* | 10/2019 | Lyon | | B60L 53/18 |
| 10,490,867 B2* | 11/2019 | Stra er | | H01B 7/423 |
| 10,497,996 B1* | 12/2019 | Muniz | | B60L 58/26 |
| 10,522,845 B2* | 12/2019 | O'Donnell | | B60H 1/00385 |
| 10,525,787 B2* | 1/2020 | Cheng | | B60H 1/04 |
| 2002/0028376 A1* | 3/2002 | Yamane | | H01M 2/1077 429/120 |
| 2002/0043413 A1* | 4/2002 | Kimishima | | B60H 1/323 180/68.1 |
| 2005/0028542 A1* | 2/2005 | Yoshida | | B60H 1/00278 62/186 |
| 2005/0056035 A1* | 3/2005 | Smith | | B60H 1/00207 62/244 |
| 2005/0167169 A1* | 8/2005 | Gering | | B60H 1/00278 237/12.3 B |
| 2005/0202310 A1* | 9/2005 | Yahnker | | B25F 5/008 429/62 |
| 2005/0285563 A1* | 12/2005 | Yoneda | | B60L 50/64 320/112 |
| 2006/0188776 A1* | 8/2006 | Aker | | H01M 2/1077 429/120 |
| 2006/0289663 A1* | 12/2006 | Smith | | B60H 1/00207 237/12.3 B |
| 2007/0080662 A1* | 4/2007 | Wu | | H01M 10/486 320/110 |
| 2008/0277101 A1* | 11/2008 | Kumar | | H01M 10/625 165/104.28 |
| 2009/0020346 A1* | 1/2009 | Krauer | | B60L 1/04 180/65.1 |
| 2009/0021221 A1* | 1/2009 | Krauer | | B60L 58/27 320/153 |
| 2009/0024256 A1* | 1/2009 | Adams | | B60H 1/00278 700/300 |
| 2009/0139781 A1* | 6/2009 | Straubel | | B60L 50/64 180/65.1 |
| 2009/0239130 A1* | 9/2009 | Culver | | H01M 2/206 429/50 |
| 2009/0258270 A1* | 10/2009 | Kizaki | | H01M 8/04253 424/413 |
| 2009/0269663 A1* | 10/2009 | Kato | | H01M 2/0235 429/180 |
| 2009/0273310 A1* | 11/2009 | Flack | | H01R 24/38 320/107 |
| 2009/0317697 A1* | 12/2009 | Dogariu | | B60H 1/00278 429/62 |
| 2010/0072954 A1* | 3/2010 | Kohn | | H02J 7/0091 320/152 |
| 2010/0089669 A1* | 4/2010 | Taguchi | | B60H 1/00257 180/65.1 |
| 2010/0104927 A1* | 4/2010 | Albright | | H01M 2/0242 429/50 |
| 2010/0119928 A1* | 5/2010 | Yoon | | H01M 2/10 429/120 |
| 2010/0134073 A1* | 6/2010 | Kohn | | H02J 7/0091 320/152 |
| 2010/0138092 A1* | 6/2010 | Kohn | | H02J 7/0091 701/22 |
| 2010/0273044 A1* | 10/2010 | Culver | | H01M 2/24 429/160 |
| 2010/0307723 A1* | 12/2010 | Thomas | | B60H 1/00278 165/104.33 |
| 2010/0315040 A1* | 12/2010 | Sakurai | | B60L 53/11 320/109 |
| 2011/0159351 A1* | 6/2011 | Culver | | H01M 2/0267 429/160 |
| 2011/0267004 A1* | 11/2011 | Krauer | | B60L 50/64 320/109 |
| 2011/0298422 A1* | 12/2011 | Failing | | B60L 3/00 320/109 |
| 2011/0301795 A1* | 12/2011 | Failing | | B60L 3/00 701/22 |
| 2011/0302078 A1* | 12/2011 | Failing | | B60L 3/00 705/39 |
| 2012/0025762 A1* | 2/2012 | Lienkamp | | B60L 3/0046 320/109 |
| 2012/0041855 A1* | 2/2012 | Sterling | | B60L 3/0046 705/34 |
| 2012/0043935 A1* | 2/2012 | Dyer | | B60L 1/003 320/109 |
| 2012/0043943 A1* | 2/2012 | Dyer | | B60L 58/26 320/137 |
| 2012/0088131 A1* | 4/2012 | Chung | | H01M 2/1077 429/72 |
| 2012/0183832 A1* | 7/2012 | Culver | | H01M 2/24 429/120 |
| 2012/0315517 A1* | 12/2012 | Duff | | H01M 2/1077 429/61 |
| 2013/0026998 A1* | 1/2013 | Dyer | | B60L 53/00 320/150 |
| 2013/0029193 A1* | 1/2013 | Dyer | | H01M 10/486 429/62 |
| 2013/0108910 A1* | 5/2013 | Culver | | H01M 2/24 429/99 |
| 2013/0184958 A1* | 7/2013 | Dyrla | | B60K 6/00 701/99 |
| 2013/0199225 A1* | 8/2013 | Lee | | B60H 1/00907 62/176.1 |
| 2014/0062397 A1* | 3/2014 | Dyer | | B60L 1/003 320/109 |
| 2014/0067323 A1* | 3/2014 | Skelton | | B60L 50/64 702/183 |
| 2014/0091748 A1* | 4/2014 | Hermann | | B60L 50/64 320/103 |
| 2014/0093760 A1* | 4/2014 | Hermann | | B60L 53/11 429/66 |
| 2014/0116673 A1* | 5/2014 | Kang | | B60H 1/004 165/222 |
| 2014/0148965 A1* | 5/2014 | Epstein | | B60L 53/53 700/297 |

(56) References Cited

U.S. PATENT DOCUMENTS

| | | | | |
|---|---|---|---|---|
| 2014/0292260 A1* | 10/2014 | Dyer | H01M 10/6561 | 320/107 |
| 2014/0306152 A1* | 10/2014 | Okamoto | H01M 4/505 | 252/182.1 |
| 2015/0017488 A1* | 1/2015 | Dyer | H01M 6/38 | 429/52 |
| 2015/0054460 A1* | 2/2015 | Epstein | B60L 11/187 | 320/109 |
| 2015/0105947 A1* | 4/2015 | Chang | B60L 58/13 | 701/22 |
| 2015/0149043 A1* | 5/2015 | Macfarlane | F01P 7/12 | 701/49 |
| 2015/0295452 A1* | 10/2015 | Dyer | H02J 7/34 | 307/23 |
| 2015/0306974 A1* | 10/2015 | Mardall | H01M 10/625 | 320/150 |
| 2015/0333379 A1* | 11/2015 | Janarthanam | B60L 58/26 | 429/61 |
| 2015/0336677 A1* | 11/2015 | Smaoui | B64C 39/024 | 320/109 |
| 2015/0380755 A1* | 12/2015 | Kazuno | B60L 50/72 | 429/432 |
| 2016/0052421 A1* | 2/2016 | Galamb | B60L 11/1874 | 165/47 |
| 2016/0129797 A1* | 5/2016 | Jackson | B60L 58/26 | 320/109 |
| 2016/0134001 A1* | 5/2016 | Lindholm | B60L 58/24 | 299/29 |
| 2016/0137305 A1* | 5/2016 | Joubert | B64D 27/24 | 417/423.1 |
| 2016/0167800 A1* | 6/2016 | Joubert | H01M 10/625 | 429/62 |
| 2016/0257217 A1* | 9/2016 | Chang | B60L 58/21 | |
| 2016/0276721 A1* | 9/2016 | Ho | H01M 10/63 | |
| 2016/0344074 A1* | 11/2016 | Zhou | H01M 10/6569 | |
| 2016/0361990 A1* | 12/2016 | Porras | B60K 11/04 | |
| 2017/0033379 A1* | 2/2017 | Kwon | H01M 8/04828 | |
| 2017/0057374 A1* | 3/2017 | Ho | B60H 1/2215 | |
| 2017/0077533 A1* | 3/2017 | Lee | H01M 8/04303 | |
| 2017/0297409 A9* | 10/2017 | Ho | B60K 1/04 | |
| 2017/0297431 A1* | 10/2017 | Epstein | F01P 3/20 | |
| 2017/0358833 A1* | 12/2017 | Jalilevand | H01M 10/613 | |
| 2018/0001784 A1* | 1/2018 | Porras | F25B 5/02 | |
| 2018/0013180 A1* | 1/2018 | Dyer | H01M 10/486 | |
| 2018/0029440 A1* | 2/2018 | Cheng | B60H 1/00392 | |
| 2018/0043747 A1* | 2/2018 | Cheng | H01M 10/615 | |
| 2018/0072181 A1* | 3/2018 | Christen | B60L 53/11 | |
| 2018/0131010 A1* | 5/2018 | Dyer | H01M 6/38 | |
| 2018/0159187 A1* | 6/2018 | Strasser | B60R 16/033 | |
| 2018/0201152 A1* | 7/2018 | Newman | H02J 7/35 | |
| 2018/0238764 A1* | 8/2018 | Kim | G01M 3/16 | |
| 2018/0304765 A1* | 10/2018 | Newman | H01M 10/446 | |
| 2018/0346139 A1* | 12/2018 | Ferran | B64D 27/24 | |
| 2019/0190093 A1* | 6/2019 | Dyer | H01M 10/486 | |
| 2019/0267688 A1* | 8/2019 | Suzuki | H01M 10/44 | |
| 2019/0312445 A1* | 10/2019 | Dyer | B60L 53/65 | |

FOREIGN PATENT DOCUMENTS

| | | |
|---|---|---|
| DE | 202015104868 | 10/2015 |
| DE | 112015004541 | 6/2017 |

* cited by examiner

CHARGING SYSTEM FOR AT LEAST ONE ACCUMULATOR BATTERY OF A VEHICLE INCLUDING HEAT TRANSFER FLUID DISTRIBUTION FOR THERMAL CONDITIONING OF THE BATTERY AND METHOD FOR MANAGING THE RECHARGING OF SAID AT LEAST ONE BATTERY

CROSS-REFERENCES TO RELATED APPLICATIONS

This application claims the benefit of the French patent application No. 1755412 filed on Jun. 15, 2017, the entire disclosures of which are incorporated herein by way of reference.

BACKGROUND OF THE INVENTION

The invention relates to devices for the storage of electrical energy in a vehicle. It falls within the field of the management of electrical energy storage devices and, more specifically, relates to a charging system for at least one accumulator battery of a vehicle.

It should be observed that the charging system for at least one accumulator battery of a vehicle described hereinafter is applied to an aircraft, specifically to an electrically-powered aircraft, but can also be adapted to other types of vehicles, such as motor vehicles, rail vehicles or naval vehicles.

Increasingly frequently, electrical energy is employed as an energy source for the propulsion of vehicles, specifically for economic and ecological reasons. This energy is frequently stored in one or more electrical accumulator batteries, described hereinafter as "batteries," installed in appropriate compartments in vehicles. The purpose of these batteries is to supply power to various components of the vehicle, such as propulsive components, control-command components and electrical equipment, for the operation thereof.

Although the charging of batteries can be executed, in part, by on-board electrical energy generating devices, batteries are generally charged when the vehicle is at rest if batteries are the primary source of propulsion energy. For the charging thereof, batteries can be extracted from the vehicle and installed on a charging bench, or can remain in the vehicle and be connected to an external charging station.

One problem of batteries is the increase in temperature thereof when they are loaded, by charging or discharging, as a result of their electrochemical behavior, specifically the release of heat by the Joule effect, due to the internal resistance of batteries associated with in-service electrical charging and discharge currents.

One known solution from the prior art for the prevention of an excessive heat-up of batteries is the incorporation of a dedicated battery cooling system in the vehicle.

A cooling system of this type constitutes a mass and bulk which, by definition, curtails the load capacity and useful volume of the vehicle, or is even difficult to apply in vehicles in which mass and volume are critical constraints. This applies, for example, to aircraft. In order to minimize the mass of the aircraft and, in consequence, to minimize its energy consumption, it may be decided not to incorporate on-board battery cooling systems in the aircraft, to the detriment of the service life of the batteries.

Even if the mass or energy consumption of the device did not constitute a critical constraint, the integration of an on-board battery cooling system in an aircraft is complicated by the fact that batteries are generally accommodated in a limited volume, for example in compartments arranged in the wings of the aircraft.

For these various reasons, the incorporation of battery cooling systems in an aircraft is therefore generally avoided, thereby resulting in a significant increase in the temperature of the batteries when they are recharged on the ground or subject to load demand in-flight.

Thus, at the end of a flight of an electrically-powered aircraft, batteries called-up for the supply of motors generally have a relatively high temperature, in certain configurations between thirty and forty-five degrees Celsius, at ambient temperatures of twenty degrees Celsius.

Before being able to undertake another operation, batteries in vehicles in general, and in aircraft in particular, require recharging, which is undertaken when the vehicle is immobilized, except in particular cases where an alternative on-board energy source is available, generally between two operations.

The immediate recharging of batteries at the end of the operation entails the risk of increasing their temperature to a temperature which exceeds the permissible temperature for batteries, as a result of the production of thermal energy during recharging and because the batteries are already at a high temperature, due to the use thereof during the operation.

In order to prevent thermal damage to the batteries, and accelerated ageing during charging-discharging cycles associated with excessive increases in temperature, it is therefore necessary, in the absence of any specific cooling system, to await the passive cooling of the batteries down to a temperature which will permit the recharging thereof. This cooling time, which is added to the recharging time, represents a potential loss of service time for the vehicle, and affects the cost-effectiveness of its operation.

It therefore seems advantageous to cool the batteries upon the completion of the operation of an electrically-powered vehicle, and during recharging of the batteries, for example between two flights of an aircraft, such that the temperature of the batteries is maintained within an optimum temperature range, in the interests of preserving their service life and reducing the immobilization time of the vehicle between two operations.

By way of an example, the optimum temperature range lies between twenty and forty-five degrees Celsius.

SUMMARY OF THE INVENTION

An object of the present invention is to alleviate the above-mentioned disadvantages by proposing a charging system for at least one vehicle battery which permits the charging of the battery or batteries, and the regulation of the temperature(s) thereof, such that the latter is (are) maintained within a permissible temperature range for the maintenance of the service life thereof.

A further object of the present invention is the proposal of a solution which permits the avoidance of an increase in the mass of the vehicle, without affecting the service life of the batteries.

To this end, the present invention relates to a charging system for at least one electrical accumulator battery of a vehicle, comprising:

a charging station which is principally designed to generate a charging current for the battery or batteries;

a system for the thermal conditioning of the battery or batteries, by the circulation of a heat transfer fluid.

The charging system comprises a vehicle-mounted segment, comprising:
- a component for the measurement of the temperature of the battery or batteries,
- equipment for the measurement or estimation of the state of charge of the battery or batteries, and
- a heat transfer fluid distribution circuit which is designed to be conducive to heat transfers between the fluid and the battery or batteries.

The charging system also incorporates a non-vehicle-mounted segment, comprising:
- a ground module of the thermal conditioning system for the generation of a flux of a heat transfer fluid, the flow rate and temperature of which is regulated, in the distribution circuit;
- an electric power module of the charging station;
- a control-command module which is designed to determine, during charging, as a function of information on the current states of charge SoCa of the battery or batteries to be charged, and of the temperatures Ta measured before and during the charging of the battery or batteries, the flow rates q and the temperatures T of the heat transfer fluid generated by the ground module of the thermal conditioning system and a charging current I generated by the electric power module of the charging station required to achieve a target final state, characterized by a target temperature Tb and a target charge SoCb at the end of a given charging time tc.

Regulation of the temperature and charging of the battery or batteries requires no specific on-board or vehicle-mounted equipment in the vehicle. The charging system according to the invention thus permits the preservation of the mass of the vehicle and, in consequence, the minimization of its energy consumption.

The distribution circuit in which the fluid is driven by circulation is configured such that, at the end of the charging time, the temperatures of the internal components of the battery or batteries are substantially mutually equal.

Moreover, reducing the temperature of the battery during recharging permits a substantial gain in the service time of the batteries, in so far as they can be used under nominal conditions, as soon as the charging thereof is complete.

In particular forms of embodiment, the invention additionally fulfils the following characteristics, deployed individually or in any technically feasible combination thereof.

In particular forms of embodiment of the invention, the control-command module determines the charging current I to be generated by the electric power module of the charging station, as a function of the temperature Ta of the battery or batteries in the course of charging, wherein the control-command module is configured to regulate the charging current I, such that the temperature of the batteries does not exceed a selected maximum value.

The batteries are thus protected against overheating.

The charging current I can be determined by the control-command module, by calculation or estimation, on the basis of comparisons carried out with predetermined models, stored in a database.

In the forms of embodiment, the on-board or vehicle-mounted segment is integrated in the on-board or vehicle-mounted facilities used in the operation of the vehicle, the resources of which it employs.

The vehicle thus incorporates only a minimum of specific elements which are liable to affect its mass and volumes. This characteristic simplifies the deployment of the charging system, and reduces the cost thereof.

In the forms of embodiment, the temperature T of the fluid is conditioned such that the margin between the fluid temperature T and the current temperature Ta of the batteries does not exceed a maximum given temperature difference $\Delta T$.

This condition protects the batteries against thermal shocks, and permits the preservation of their service life.

In the forms of embodiment, the ground module of the thermal conditioning system is configured to measure the moisture content of the fluid prior to the circulation thereof in the distribution circuit of the on-board segment, wherein the control-command module is configured for the regulation of the temperature T of the fluid above the dew point, in consideration of the maintenance of the relative humidity level in the compartment below a predetermined threshold value.

This characteristic allows the battery compartments to be kept dry, protects the batteries against condensation and prevents any potential problems resulting from electrochemical reactions associated with the presence of condensates.

In the forms of embodiment, the selected maximum value for the target temperature Tb at the end of the given charging time tc for the battery or batteries does not exceed a maximum of twenty degrees Celsius.

In the forms of embodiment, the vehicle which incorporates the temperature measurement components for the battery or batteries, the equipment for the measurement or estimation of the state of charge of the battery or batteries, and the distribution circuit for a heat transfer fluid which is designed to be conducive to heat transfers between the fluid and the battery or batteries, is an aircraft.

A further object of the present invention relates to a method for managing the charging of at least one electrical accumulator battery of a vehicle, deployed by a charging system for at least one electrical accumulator battery of a vehicle, as described above, comprising the following steps:
- the acquisition or estimation of the temperature Ta of the batteries and of the current state of charge SoCa of the batteries; electrothermal modelling of the batteries may be executed, in order to predict the thermal behavior of the batteries 10;
- the definition of operational constraints, including a given charging time tc, a target temperature Tb and a target state of charge SoCb for the batteries at the end of the charging time tc;
- the definition of technical constraints, including a maximum charging current Imax;
- the calculation of a charging current I by the control-command module as a function of the current state of charge SoCa, the target state of charge SoCb and the given charging time tc, wherein the charging current is calculated in consideration of the constraint for the maximum charging current Imax;
- the determination of a strategy for the thermal control of the batteries wherein the control-command module determines, as a function of time, characteristics for the charging current I, the temperature T and the flow rate q of the heat transfer fluid to be circulated in the distribution circuit, in consideration of the initial temperature Ta, the target temperature Tb and the charging time tc; determination of the thermal control strategy can advantageously be executed in consideration of the thermal behavior of the batteries;
- the charging of the batteries, for the delivery to the batteries of the calculated charging current I, as a function of time, such that they achieve the target state of charge SoCb at the end of the charging time tc, and for the thermal conditioning of the batteries, such that the heat transfer fluid is circulated in accordance with the characteristics determined for the flow rate q and temperature T, such that the batteries achieve the target temperature Tb at the end of the charging time tc.

In the particular forms of embodiment, one of the operational constraints defined in the step is a maximum temperature difference ΔT between the temperature T of the heat transfer fluid and the temperature Ta of the batteries, wherein the temperature T is determined during the determination of the thermal control strategy, such that the margin between the temperature T of the heat transfer fluid and the temperature Ta does not exceed the maximum temperature difference ΔT.

This characteristic protects the batteries against thermal shocks, and permits the preservation of their service life.

In the particular forms of embodiment, the method for managing the recharging of at least one electrical accumulator battery of a vehicle comprises a step for the measurement of the moisture content of the fluid prior to the circulation thereof in the distribution circuit of the on-board segment, by the ground module of the thermal conditioning system, wherein the control-command module is configured for the regulation of the temperature T of the fluid above the dew point, in consideration of the maintenance of the relative humidity level in the compartment below a predetermined threshold value.

It is thus possible to reduce the relative humidity and to prevent condensation in the compartment and on the batteries, thereby preserving their service life.

BRIEF DESCRIPTION OF THE DRAWINGS

The invention will be better understood on reading the following description, which is provided by way of non-limiting example, and with reference to the figures, in which.

In these figures, identical reference numbers from one figure to another represent identical or analogous elements. Moreover, for reasons of clarity, the drawings are not to scale, unless indicated otherwise.

DETAILED DESCRIPTION OF THE PREFERRED EMBODIMENTS

The present invention relates to a battery charging system 20 of a vehicle which permits the charging of the batteries and the conditioning of the temperatures thereof, in order to maintain the latter within a permissible temperature interval, in the interests of preserving their service life.

In the text hereinafter, by way of non-limiting example, the vehicle is an aircraft incorporating a plurality of batteries 10.

Figure 1:
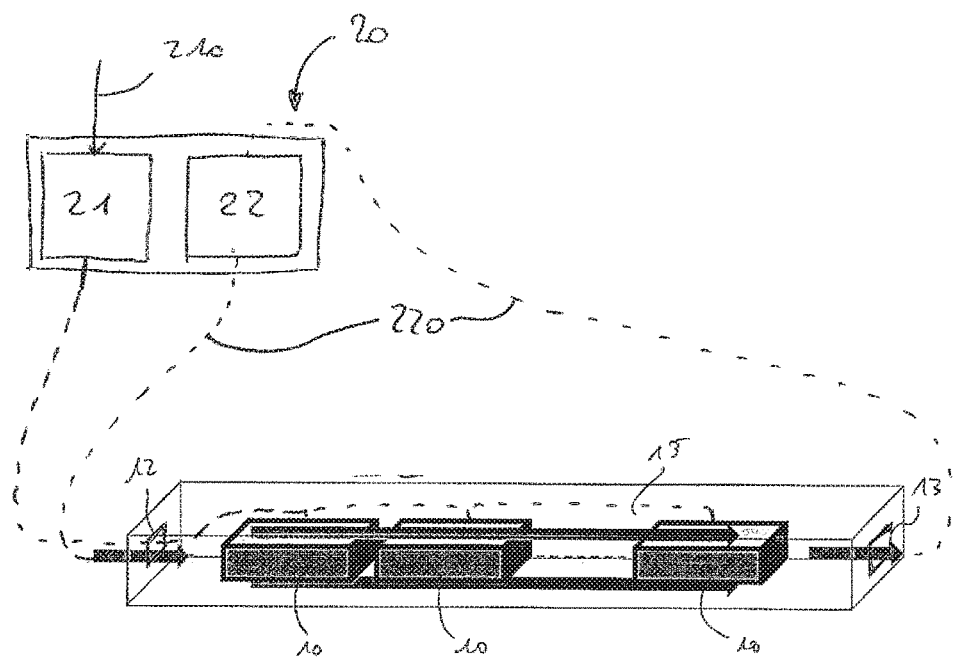
FIG. 1 shows a schematic view of a battery charging system for a vehicle, connected to a series of batteries in a battery storage compartment, in which a distribution circuit is formed according to a first form of embodiment.
Figure 2:
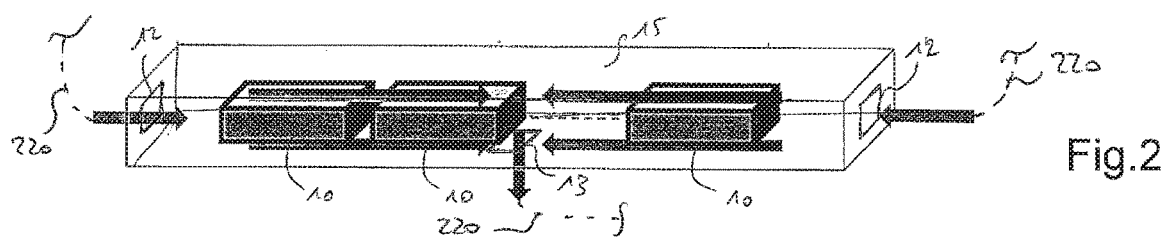
FIG. 2 shows a schematic view of a series of batteries in a battery storage compartment, in which a distribution circuit is formed according to a second form of embodiment.
Figure 3:
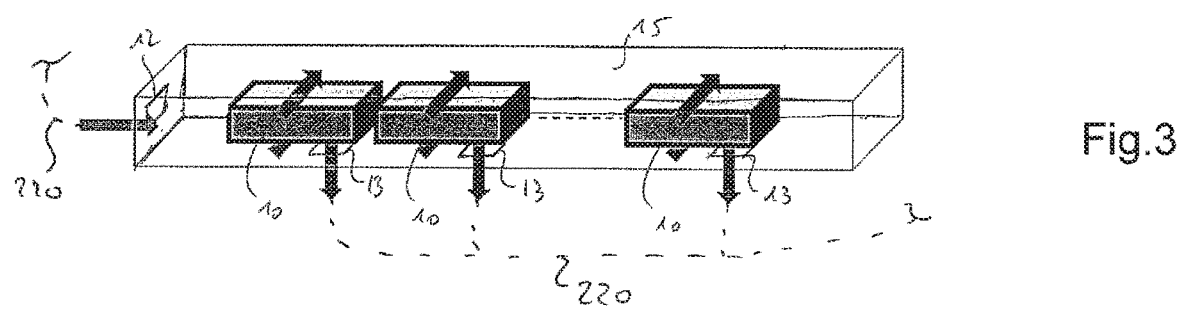
FIG. 3 shows a schematic view of a series of batteries in a battery storage compartment, in which a distribution circuit is formed according to a third form of embodiment.
Figure 4:
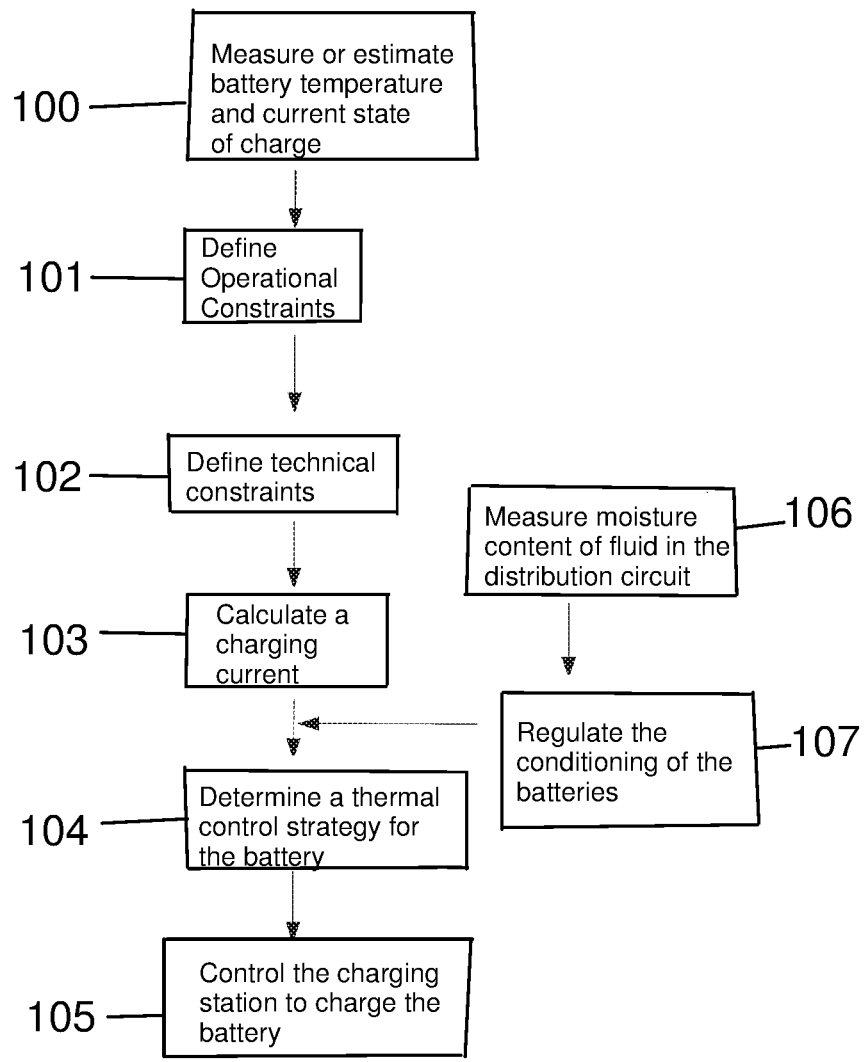
FIG. 4 shows an organigram representing the steps of a method for managing the recharging of at least one electrical accumulator battery of a vehicle.

In the forms of embodiment described hereinafter, the batteries of the vehicle are installed in a storage compartment 15 formed in the internal volume of each of at least two wings of the aircraft, respectively arranged on either side of a fuselage of the aircraft. FIGS. 1 to 3 show schematic representations of a storage compartment 15 for batteries 10, extending between two longitudinal ends in a longitudinal axis, wherein the batteries 10 in the storage compartment are mutually juxtaposed along the longitudinal axis.

As represented in FIG. 1, the charging system 20 for batteries 10 incorporates a charging station 21 comprising an electric power supply 210, represented on FIG. 1 by an arrow. For example, the charging station 21 is arranged in an aircraft parking zone of an airport, and is connected to the electricity distribution network of the airport. The charging station 21 is designed to be electrically connected to the batteries 10 when the vehicle is immobilized between two operations, and is appropriate for the generation of a charging current for the batteries 10. This electrical connection between the charging station 21 and the batteries 10 is represented on FIG. 1 by dashed lines. The charging current is generated by at least one electric power module of the charging station 21.

In the forms of embodiment of the invention described in the present text, a charging time tc of the batteries 10 is dictated by the duration of immobilization on the ground of an aircraft, the batteries of which are to be charged, between two flights of the aircraft.

The charging system 20 for batteries 10 also comprises a thermal conditioning system 22 for the batteries by the circulation of a heat transfer fluid.

Advantageously, the heat transfer fluid may be air. Air has numerous advantages, including a high volumetric heat capacity, ease of circulation and conditioning, and widespread availability. The thermal conditioning system 22 for the batteries 10 may incorporate a heat pump, the operating principles of which are known to a person skilled in the art.

Alternatively, the fluid can circulate in at least one line 220; represented in FIG. 1 by a dashed line. The line 220 can form a closed circuit, according to the type of fluid. More specifically, if the fluid is in liquid form, or is a gas other than air or a phase-change material, closed circuit circulation is preferred.

The charging system 20 incorporates a non-aircraft-mounted segment, comprising a ground module of the thermal conditioning system 22, configured for the generation of a fluid flux in a distribution circuit which extends, at least in part, to each storage compartment 15 of the batteries 10. Depending upon the employment of a liquid or gaseous fluid, this ground module can incorporate a blower or a pump which is known to a person skilled in the art.

The fluid flux is represented in the storage compartment 15 by the arrows on FIGS. 1 to 3.

As represented schematically on FIGS. 1 to 3, the storage compartment 15 incorporates at least one inlet opening 12 for the fluid and at least one discharge opening 13 for the fluid, to each of which a line 220 can be detachably fitted in a communicating arrangement, in order to permit the entry of fluid to the storage compartment 15 of the batteries 10, and the discharge thereof from the storage compartment 15.

If the circulation of fluid in a closed circuit is selected, a line 220 is fitted in a detachable manner to the or to each of the discharge openings 13, and to the ground module of the thermal conditioning system 22, which is configured to generate a flux of fluid.

Preferably, on each of these inlet openings 12 and discharge openings 13, shutters are configured for movement between an opening position, which permits the attachment of the line 220 and the circulation of air in the distribution circuit, and a shut-off position.

In the storage compartment 15, the distribution circuit is configured to be conducive to thermal exchanges between the fluid and the batteries 10. For example, it is particularly advantageous that the fluid should touch the electrical connectors of the batteries, the material of which is generally a good thermal conductor, and is in contact with the internal components of the batteries.

According to the type of fluid in circulation, the distribution circuit may incorporate fluid circulation lines (not represented on the figures), extending in the storage compartment 15 from the inlet opening 12 to the discharge opening 13. Specifically, it is selected that the fluid is circulated in lines, where the fluid is in the liquid form.

The distribution circuit is configured such that the fluid flux conditions the temperature of all the batteries 10 in a substantially uniform manner, in order to limit the temperature gradient between each battery 10. In other words, the distribution circuit is configured for the conditioning of the temperatures of the batteries 10 such that they tend to assume substantially the same temperature at the end of the charging time tc.

In the form of embodiment illustrated in FIG. 1, the inlet opening 12 and the discharge opening 13 are arranged in opposition to each other, at each of the longitudinal ends of the storage compartment 15. In circulation, the fluid thus progresses in the longitudinal axis of the storage compartment 15 in which it flows, entering into contact with each of the batteries 10 in succession.

This form of embodiment is simple to deploy, as there is only one fluid flux to be conditioned.

It should be observed that, as FIGS. 2 and 3 represent forms of embodiment of distribution circuits which differ from that represented in FIG. 1, the charging system 20 has not been represented in these figures.

In the form of embodiment represented in FIG. 2, the storage compartment 15 incorporates one inlet opening 12 arranged at each of the longitudinal ends of the storage compartment 15, and a discharge opening 13 arranged between the longitudinal ends, for example equidistantly from each of the latter.

In circulation, the fluid thus progresses in the longitudinal axis of the storage compartment 15 in which it flows, from the lateral ends to the discharge opening 13, as represented by the arrows in FIG. 2.

The batteries 10 which are thermally conditioned by a fluid circulating in a distribution circuit according to the form of embodiment represented in FIG. 2 are subject to more rapid change than those which are thermally conditioned by a fluid circulating in a distribution circuit according to the form of embodiment represented in FIG. 1.

FIG. 3 shows a schematic illustration of a series of batteries in a storage compartment 15, in which a distribution circuit is constituted according to a third form of embodiment. In this form of embodiment, the distribution circuit is configured such that, in circulation, the fluid is brought into direct contact with each battery 10, as represented in FIG. 3. To this end, the storage compartment 15 incorporates an inlet opening 12, for example at one of its longitudinal ends, and a discharge opening 13 can be arranged opposite each battery 10. Alternatively, the storage compartment 15 can advantageously incorporate two inlet openings 12, arranged in mutual opposition, at each of the longitudinal ends of the storage compartment 15, in an analogous manner to the form of embodiment represented in FIG. 2.

The batteries 10 which are thermally conditioned by a fluid circulating in a distribution circuit according to this form of embodiment are subject to more rapid change than those which are thermally conditioned by a fluid circulating in a distribution circuit according to the forms of embodiment represented in FIGS. 1 and 2.

The selection of a particular form of embodiment of the distribution circuit may be based upon the simplicity of deployment of the circuit in relation to the thermal conditioning performance for the batteries, specifically with respect to the uniformity of the temperatures achieved for each battery, at the end of the charging time tc.

The form of embodiment represented in FIG. 3 has the advantage that the temperature of each battery is conditioned by a single fluid flux.

The temperature of each battery is thus conditioned individually, thereby advantageously reducing the thermal conditioning time of each battery. During the charging time tc, all the batteries are therefore at a substantially identical temperature, or at least undergo similar thermal conditioning.

The charging system 20 for batteries 10 incorporates an aircraft-mounted segment (not represented in the figures), comprising a temperature measurement device for the batteries 10, which is configured to measure or estimate the temperature of each battery 10.

The on-board segment also incorporates a device for the measurement or estimation of the state of charge of the batteries 10, which will be known to a person skilled in the art. For example, the charging system 20 can be connected to a device for the measurement or estimation of the state of charge of the batteries 10, which is deployed in order to establish the independence of the aircraft. The state of charge of each battery 10 is advantageously known at any time by the deployment of this measurement or estimation device.

The non-aircraft-mounted segment incorporates a control-command module, to which the temperature measurement devices of the batteries 10, devices for the measurement or estimation of the state of charge of the batteries 10 and means for the measurement of the temperature and flow rate of the fluid are connected. The control-command module can also be directly integrated in the batteries.

The control-command module is configured for the definition, as a function of time, the temperature T and the flow rate q of the fluid, in consideration of the temperature Ta of the batteries 10 measured before and throughout the charging thereof, and as a function of a target temperature Tb and a target state of charge SoCb of the batteries 10 at the end of a given charging time tc.

The maximum selected value of the target temperature Tb at the end of the given charging time tc of the batteries 10 shall be no greater than twenty degrees Celsius.

More specifically, during the given charging time tc, the temperature T and the flow rate q of the fluid are regulated by the thermal conditioning system 22, controlled by the control-command module, as a function of the initial temperature Ta of the batteries 10, the target temperature Tb thereof at the end of the given charging time tc and the thermal behavior thereof during charging.

The thermal behavior of the batteries 10 which is simulated, for example, when they are in contact with the heat transfer fluid, is predicted by ma electrothermal modelling of the batteries 10.

The temperature T of the fluid is conditioned to prevent any excessively large temperature difference between the fluid and each battery 10 which might result in a thermal shock on the batteries. A thermal shock of this type might result in damage to the batteries 10. The thermal conditioning of the batteries 10 within a given range of acceptable values, with no thermal shock, will preserve the service life thereof.

The fluid temperature can be conditioned such that the margin between the temperature T of the fluid and the temperature Ta of the batteries 10 does not exceed a maximum selected temperature difference ΔT. In this form of embodiment, this selected value is fifteen degrees Celsius; if, at a given time, the batteries 10 show a temperature which is substantially equal to forty-five degrees Celsius, the fluid temperature at the inlet to the distribution circuit can therefore be cooled, at a minimum, to a temperature of approximately thirty degrees Celsius. In an analogous manner, if the batteries 10 show a negative temperature of approximately five degrees Celsius, the fluid temperature at the inlet to the distribution circuit can therefore be increased, at a maximum, to approximately ten degrees Celsius.

Advantageously, the determination of the temperature T and the flow rate q of the fluid are executed continuously by the control-command module, throughout the charging of the batteries 10.

The management of the temperature of the batteries 10 is thus executed in an accurate and reactive manner, permitting the optimization of the service life thereof. It may be necessary to accelerate or intensify the thermal conditioning of the batteries 10 if they are to achieve the target temperature Tb at the end of the charging time tc, particularly if the batteries 10 are at a high temperature. One means of intensifying or accelerating the thermal conditioning of the batteries 10, with no associated risk of thermal shock, is to increase the flow rate q of the fluid.

Moreover, the control-command module is configured such that, where the margin between the temperature T of the fluid and the temperature Ta of the batteries 10 achieves the maximum temperature difference ΔT, the control-command module controls the thermal conditioning system 22 such that the flow rate q of the fluid is increased.

The fluid temperature can be conditioned for the prevention of the condensation or freezing of water particles, which are present in the air, in the storage compartment 15. Additionally, the thermal conditioning system 22 is controlled for the conditioning of the fluid temperature T above the dew point of air, in order to prevent any formation of liquid water on the batteries 10 by the condensation of water vapor present in the air.

For example, the fluid temperature T is conditioned such that it remains within a predetermined interval, for example between one and thirty degrees Celsius.

Alternatively, in another example, air is dehydrated by a dedicated device.

The charging current I of the batteries 10 is calculated by the control-command module as a function of the current state of charge SoCa and the target state of charge SoCb of the batteries at the end of the given charging time tc.

The control-command module determines the charging current I of the batteries 10 such that it is lower than a maximum value Imax of the charging current which is acceptable for the batteries 10.

Advantageously, the control-command module is configured to control the electric power module of the charging station 21 such that the batteries 10 are charged at the charging current I determined.

The system thus responds accurately to the charging current requirements of the batteries 10, whilst protecting the batteries against overheating.

The charging current I can be determined by the control-command module by calculation, or by estimation on the basis of comparisons executed between the measured data and predetermined models or data charts which are stored in a database.

In other forms of embodiment of the invention, the on-board segment is integrated in the on-board facilities used in the operation of the vehicle, the resources of which it employs. For example, temperature measurement devices for the batteries 10 and devices for the measurement or estimation of the state of charge of the batteries may be inherent devices of the vehicle which are employed by the charging system 20 according to the present invention during the charging of the batteries 10 of the vehicle.

Thus, the mass of the vehicle is little affected, if at all, by the integration of additional elements. This characteristic also contributes to simplification of the deployment of the charging system 20 and reduces the cost thereof.

The ground module of the thermal conditioning system is configured to measure the moisture content of the fluid prior to the circulation thereof in the distribution circuit of the on-board segment. The control-command module is configured for the conditioning of the temperature T of the fluid above the dew point, in consideration of the maintenance of the relative humidity level in the compartment below a predetermined threshold value, for example a relative humidity of eighty percent. This characteristic allows the maintenance of dry conditions in the storage compartment 15, the protection of the batteries 10 against condensation, and the prevention of any potential problems resulting from electrochemical reactions associated with the presence of condensates.

The present invention also relates to a method for managing the recharging of batteries 10 of a vehicle which is deployed by a charging system 20 for the electrical accumulator batteries 10 of a vehicle.

The charging management method permits the transition from an initial temperature Ta and a current state of charge SoCa of the batteries 10 to a target temperature Tb and a target state of charge SoCb of the batteries at the end of a given charging time tc.

In a preliminary acquisition or estimation step 100, the initial temperature Ta of the batteries 10 is measured or estimated by the temperature measurement device, and the initial state of charge SoCa of the batteries 10 is determined by a device for the measurement or estimation of the state of charge of the batteries 10; electrothermal modelling of the batteries can be deployed, in order to predict the thermal behavior of the batteries 10.

The method also comprises a step for the definition of operational constraints 101. These operational constraints are specifically characterized by the given charging time tc, the target temperature Tb, and the target state of charge SoCb of the batteries 10 at the end of the charging time tc.

Technical constraints are defined in a step for the definition of technical constraints 102. These technical constraints are specifically characterized by a maximum charging current Imax and a maximum temperature difference ΔT representing the maximum permissible margin between the temperature T of the heat transfer fluid and the initial temperature Ta of the batteries 10.

A charging current I for the batteries 10 is calculated, in a calculation step 103, by the control-command module, as a function of the current state of charge SoCa, the target state of charge SoCb, and the given charging time tc. The charging current is calculated in consideration of the constraint for the maximum charging current Imax.

In a step for the determination of a thermal control strategy 104 for the batteries 10, the control-command module determines, as a function of time, characteristics for the charging current I, the temperature T and the flow rate q of the heat transfer fluid to be circulated in the distribution circuit, in consideration of the initial temperature Ta, the target temperature Tb and the charging time tc; determination of the thermal control strategy can advantageously be executed in consideration of the thermal behavior of the batteries 10. The temperature T is determined such that the margin between the temperature T of the heat transfer fluid and the instantaneous temperature of the batteries does not exceed the maximum temperature difference ΔT.

Thereafter, the charging station 21 is controlled by the control-command module, in a step 105 for the charging of the batteries 10, in order to deliver, as a function of time, the calculated charging current I to the batteries, such that the latter achieve the target state of charge SoCb at the end of the charging time tc.

At the same time, the thermal conditioning system 22 is controlled by the control-command module, in order to initiate the circulation of the heat transfer fluid in a distribution circuit, in accordance with the determined characteristics for the flow rate q and the temperature T, such that the batteries 10 achieve the target temperature Tb at the end of the charging time tc.

The charging management method is interrupted when the state of charge achieves a value which is representative of the target state of charge SoCb of the batteries 10 and the temperature of the batteries is substantially equal to the target temperature Tb.

In other words, during the charging time tc, for such time as the target state of charge SoCb of the batteries 10 has not been achieved, and for such time as the target temperature Tb has not been achieved, the charging of the batteries and/or the thermal conditioning thereof will continue.

The management process can include a measuring step 106 for the moisture content of the fluid prior to the circulation thereof in the distribution circuit of the on-board segment by the ground module of the thermal conditioning system. To this end, the control-command module is configured for the conditioning of the temperature T of the fluid above the dew point, in consideration of the maintenance of the relative humidity level in the compartment below a predetermined threshold value.

During the regulation step 107, as a result of the fluid temperature, the conditioning of the batteries is limited. The temperature of the batteries 10 is therefore liable to vary outside the permissible range of temperatures, if the batteries are in the course of charging.

The charging system 20 can incorporate indicator elements which are connected to the control-command module, wherein the control-command module is configured to activate these indicator elements where the given charging time tc is insufficient to achieve the target state of charge SoCb of the batteries and the target temperature Tb.

More generally, it should be observed that the forms of implementation and embodiment considered above have been described by way of non-limiting examples and that, in consequence, further variants are conceivable.

Specifically, the invention has principally been described in consideration of a charging system 20 which is designed for the charging of a plurality of batteries 10 of a vehicle. However, the charging system 20 is also appropriate for the charging of a single battery of a vehicle.

Moreover, the application of the invention has been described in the aeronautical field, wherein the vehicle is an aircraft. However, in accordance with further examples, there are no grounds for excluding the consideration of other types of vehicles in other technical fields, such as the automobile, rail or naval fields.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A charging system for at least one electrical accumulator battery of a vehicle, comprising:
   a charging station configured to generate a charging current for the at least one electrical accumulator battery;
   a thermal conditioning system configured to thermally condition the at least one electrical accumulator battery, by circulation of a heat transfer fluid;
   wherein said charging system incorporates a vehicle-mounted segment, comprising:
      a temperature measuring component for measuring a battery temperature of the at least one electrical accumulator battery,
      a system for measuring or estimating a state of charge of the at least one electrical accumulator battery, and
      a heat transfer fluid distribution circuit configured to be conducive to heat transfers between the heat transfer fluid and the at least one electrical accumulator battery; and
   wherein said charging system incorporates a non-vehicle-mounted segment, comprising:
      a ground module of the thermal conditioning system for generating a flux of the heat transfer fluid, a heat transfer fluid flow rate and a heat transfer fluid temperature which is regulated, in the heat transfer fluid distribution circuit;
      at least one electric power module of the charging station;
      a control-command module configured to determine, during charging, as a function of information on current states of charge of the at least one electrical accumulator battery to be charged, and of the battery temperatures measured before and during the charging of the at least one electrical accumulator battery, the heat transfer fluid flow rates and the heat transfer fluid temperatures generated by the ground module of the thermal conditioning system and a charging current generated by the electric power module of the charging station required to achieve a target final state, characterized by a target temperature and a target state of charge at an end of a given charging time;

wherein said ground module of the thermal conditioning system is configured to measure a moisture content of the heat transfer fluid prior to a circulation thereof in the heat transfer fluid distribution circuit of the vehicle-mounted segment, wherein the control-command module is configured for the setting of the heat transfer fluid temperature above a dew point, in consideration of maintaining a relative humidity level in a compartment containing the at least one electrical accumulator battery below a predetermined threshold value.

2. The charging system for the at least one electrical accumulator battery of the vehicle according to claim 1, wherein the vehicle-mounted segment is integrated in vehicle-mounted facilities used in an operation of the vehicle, the vehicle-mounted segment employing resources of the vehicle.

3. The charging system for the at least one electrical accumulator battery of the vehicle according to claim 1, wherein the heat transfer fluid temperature is conditioned such that a margin between said heat transfer fluid temperature and the battery temperatures does not exceed a given maximum temperature difference.

4. The charging system for the at least one electrical accumulator battery of the vehicle according to claim 1, wherein the vehicle which incorporates the temperature measuring component, the system for measuring or estimating the state of charge of the at least one electrical accumulator battery, and the heat transfer fluid distribution circuit for a heat transfer fluid configured to be conducive to said heat transfers between the heat transfer fluid and the at least one electrical accumulator battery, is an aircraft.

5. The charging system for the at least one electrical accumulator battery of the vehicle according to claim 1, wherein the control-command module determines the charging current to be generated by the electric power module of the charging station, as a function of the battery temperatures during charging, wherein said control-command module is configured to regulate the charging current, such that the battery temperatures does not exceed a selected maximum value.

6. The charging system for the at least one electrical accumulator battery of the vehicle according to claim 5, wherein the selected maximum value for the target temperature at the end of the given charging time does not exceed a maximum of twenty degrees Celsius.

7. A method for managing the charging of at least one electrical accumulator battery of the vehicle, deployed by the charging system for the at least one electrical accumulator battery of the vehicle, the charging system comprising:
a charging station configured to generate a charging current for the at least one electrical accumulator battery;
a thermal conditioning system configured to thermally condition the at least one electrical accumulator battery, by circulation of a heat transfer fluid;
wherein said charging system incorporates a vehicle-mounted segment, comprising:
a temperature measuring component for measuring a battery temperature of the at least one electrical accumulator battery,
a system for measuring or estimating a state of charge of the at least one electrical accumulator battery, and
a heat transfer fluid distribution circuit configured to be conducive to heat transfers between the heat transfer fluid and the at least one electrical accumulator battery; and
wherein said charging system incorporates a non-vehicle-mounted segment, comprising:
a ground module of the thermal conditioning system for generating a flux of the heat transfer fluid, a heat transfer fluid flow rate and a heat transfer fluid temperature which is regulated, in the heat transfer fluid distribution circuit;
at least one electric power module of the charging station;
a control-command module configured to determine, during charging, as a function of information on current states of charge of the at least one electrical accumulator battery to be charged, and of the battery temperatures measured before and during the charging of the at least one electrical accumulator battery, the heat transfer fluid flow rates and the heat transfer fluid temperatures generated by the ground module of the thermal conditioning system and a charging current generated by the electric power module of the charging station required to achieve a target final state, characterized by a target temperature and a target state of charge at an end of a given charging time;
wherein said ground module of the thermal conditioning system is configured to measure a moisture content of the heat transfer fluid prior to a circulation thereof in the heat transfer fluid distribution circuit of the vehicle-mounted segment, wherein the control-command module is configured for the setting of the heat transfer fluid temperature above a dew point, in consideration of maintaining a relative humidity level in a compartment containing the at least one electrical accumulator battery below a predetermined threshold value,
the method comprising the following steps:
acquiring or estimating the battery temperatures and of the current state of charge of the at least one electrical accumulator battery;
defining operational constraints, including the given charging time, the target temperature and the target state of charge for the at least one electrical accumulator battery at the end of the charging time;
defining technical constraints, including a maximum charging current;
calculating the charging current by the control-command module as a function of the current state of charge, the target state of charge and the given charging time, wherein the charging current is calculated in consideration of a constraint for the maximum charging current;
determining a thermal control strategy of the at least one electrical accumulator battery wherein the control-command module determines, as a function of time, characteristics for the charging current, the heat transfer fluid temperature and the heat transfer fluid flow rate to be circulated in the heat transfer fluid distribution circuit, in consideration of an initial temperature, the target temperature and the charging time;
charging the at least one electrical accumulator battery, for the delivery to said at least one electrical accumulator battery of the calculated charging current, as a function of time, such that the at least one electrical accumulator battery achieves the target state of charge at the end of the charging time, and for the thermal conditioning of the at least one electrical accumulator battery, such that the heat transfer fluid is circulated in accordance with the characteristics determined for the heat transfer fluid flow rate and the heat transfer fluid temperature, such that the at least one electrical accumulator battery achieves the target temperature at the end of the charging time;

measuring the moisture content of the heat transfer fluid prior to the circulation thereof in the heat transfer fluid distribution circuit, wherein the control-command module is configured for the setting of the heat transfer fluid temperature above the dew point, in consideration of maintaining the relative humidity level in the compartment containing the at least one electrical accumulator battery below the predetermined threshold value.

8. The method for managing the charging of the at least one battery according to claim 7, wherein one of the operational constraints defined in the defining operational constraints step is a maximum temperature difference between the heat transfer fluid temperature and the battery temperatures, wherein a temperature difference is determined during the determination of the thermal control strategy, such that the temperature difference between the heat transfer fluid temperature and the battery temperature does not exceed the maximum temperature difference.

* * * * *